United States Patent [19]

Windawi et al.

[11] Patent Number: 4,464,480
[45] Date of Patent: Aug. 7, 1984

[54] METHOD FOR OBTAINING IMPROVED CATALYST SYSTEMS

[75] Inventors: Hassan Windawi; Randy J. Lawson, both of Arlington Heights, Ill.

[73] Assignee: UOP Inc., Des Plaines, Ill.

[21] Appl. No.: 498,625

[22] Filed: May 27, 1983

[51] Int. Cl.$^3$ .................. B01J 21/02; B01J 31/02
[52] U.S. Cl. .................................. 502/207; 502/150
[58] Field of Search .............. 252/410, 430, 431 R, 252/432; 502/150, 207

[56] References Cited

U.S. PATENT DOCUMENTS

| | | | |
|---|---|---|---|
| 2,961,433 | 11/1960 | Linn | 252/432 X |
| 3,210,157 | 10/1965 | Lewis, Jr. et al. | 252/432 X |
| 3,231,515 | 1/1966 | Ziegles et al. | 252/430 X |
| 3,288,725 | 11/1966 | Oftondilian | 252/430 X |
| 3,547,830 | 12/1970 | Shropshire | 252/432 |
| 3,796,671 | 3/1974 | Gleim | 252/432 |
| 4,226,809 | 10/1980 | Shioyama | 252/432 X |

FOREIGN PATENT DOCUMENTS

| | | | |
|---|---|---|---|
| 152881 | 2/1952 | Australia | 252/432 |
| 2519580 | 11/1976 | Fed. Rep. of Germany | 252/432 |
| 56-110631 | 1/1981 | Japan | 252/430 |
| 416083 | 6/1974 | U.S.S.R. | 252/432 |

*Primary Examiner*—Delbert E. Gantz
*Assistant Examiner*—William G. Wright
*Attorney, Agent, or Firm*—James R. Hoatson, Jr.; Raymond H. Nelson; William H. Page, II

[57] ABSTRACT

Improved catalyst systems which may be used for a wide variety of chemical reactions such as gas conversion reactions may be prepared by impregnating a transition metal compound which may contain a structural promoter with a nonaqueous solution of an alkali metal superhydride in order to provide a more uniform distribution of the chemical promoter on the active surface of the catalyst. As an example, iron oxide which has been structurally promoted with aluminum may be impregnated with a nonaqueous solution of potassium triethylborohydride to prepare an active gas conversion catalyst.

14 Claims, No Drawings

METHOD FOR OBTAINING IMPROVED CATALYST SYSTEMS

BACKGROUND OF THE INVENTION

Transition metal catalysts are utilized for a wide variety of chemical reactions. As an example of the use of transition metal catalysts, commercial catalysts which have been employed in the conversion of gases into useful products have generally been composed of an iron-containing compound such as iron oxide which may be in the form of a magnetite. The iron oxide catalysts have been promoted in either a structural or chemical manner to enhance the stability of the catalyst, thus permitting the catalyst to be used in these reactions to obtain the desired products at an optimum value. One form of structural promotion of the iron-containing catalyst involves the addition of a component such as alumina which may be in various forms, such as alpha-alumina, eta-alumina, gamma-alumina, etc. to form a spinel structure with the magnetite to enhance and stabilize the catalyst possessing a high surface area. The addition of the promoter substance enhances the separation of the magnetite particles and thus will minimize any possible sintering effect which may occur during the reduction treatments as well as any sintering which may occur during the operation of the chemical reaction utilizing such catalysts. Another example of promoting the iron-containing catalyst is in a chemical manner such as the addition of an alkali material such as sodium oxide, potassium oxide, lithium oxide, barium oxide, magnesium oxide, etc. which, in essence, increases the basicity of the iron.

However, a disadvantage or drawback which occurs in many instances when utilizing a structural or chemical promoter is that an interaction develops between the structural and chemical promoter and the resulting combined aggregate separates and segregates from the iron catalyst, thus leading to an inhomogeneity in the distribution of the promoters with a concurrent loss in optimization of the catalyst activity. The loss of optimization further results in a decrease in the percentage of conversion of the gases with a corresponding decrease in the yield of the desired useable products.

As hereinbefore set forth, alkali compounds are known promoters of catalysts which may be employed in synthesis gas utilization processes such as a Fischer-Tropsch process, as well as being utilized in the synthesis of ammonia by reacting hydrogen and nitrogen at reaction conditions. As will hereinafter be shown, it has now been discovered that transition metal catalysts containing a structural promoter may be treated with a chemical promoter in such a manner so as to provide a more uniform promotion of transition metal catalysts.

BRIEF SUMMARY OF THE INVENTION

This invention relates to a method for preparing catalyst systems which may be used in a wide variety of chemical reactions and particularly in reactions involving the conversion of gas to useable products. More specifically, the invention resides in a method of adding a chemical promoter to a transition metal catalyst containing a structural promoter so that the finished catalyst system will contain a more uniform distribution of the promoters throughout the system.

As hereinbefore set forth, in many chemical reactions and particularly reactions involving a Fischer-Tropsch process or the synthesis of ammonia, the conventional catalysts which have been employed comprise an iron-containing compound which may contain a structural promoter of the type hereinafter set forth in greater detail and which have been chemically promoted by the addition of an alkali. The catalysts are prepared in fused or precipitated form and thereafter impregnated with an aqueous solution of an alkali compound such as potassium carbonate, sodium hydroxide, etc. However, the resulting catalysts usually exhibit a nonuniform distribution of the alkali on the active surface of the transition metal such as iron. In addition, it also appears that the alkali will associate in a preferential manner with the structural promoters which have been added to the transition metal to impart strength and durability to the metal catalyst.

It is therefore an object of this invention to provide a process for improving the structure of a transition metal catalyst system. A further object of this invention is to provide a method for obtaining a catalyst system whereby the resulting system may be utilized in a more efficient manner for a longer period of time.

In one aspect, an embodiment of this invention resides in a method for the preparation of a catalyst system which comprises treating a compound containing at least one transition metal with a chemical promoter comprising an alkali metal superhydride at treating conditions and recovering the resultant catalyst system.

A specific embodiment of this invention is found in a method for the preparation of a catalyst system which comprises treating a compound containing iron and alumina with a chemical promoter comprising potassium triethyl-borohydride at a temperature in the range of from about $-80°$ C. to about ambient, and recovering the resultant catalyst system.

Other objects and embodiments will be found in the following further detailed description of the present invention.

As hereinbefore set forth, the present invention is concerned with a method for preparing a catalyst system which will possess a uniform distribution of structural and chemical promoters on the surface of the active transition metal which will impart a catalytic activity to various chemical reactions. Examples of transition metals which are employed as catalysts and which may be treated with a structural promoter and a chemical promoter of the type hereinafter set forth in greater detail will include copper, iron, nickel, cobalt, ruthenium, molybdenum, vanadium, titanium, chromium, zinc and manganese. It is contemplated within the scope of this invention that the catalyst system containing a structural promoter and a chemical promoter may comprise either a single transition metal or a combination of transition metals. In order to impart additional strength and stability to a transition metal which is used as a catalyst, the transition metal is combined with a structural promoter. In the preferred embodiment of the invention, the structural promoters will comprise materials such as aluminum, silicon, titanium, zirconium, yttrium and lanthanum. The structural promoters may be incorporated with the transition metal by using either soluble salts of these metals or as oxides.

In one embodiment, the catalyst system may be prepared by coprecipitating the transition metal or combination of transition metals and the structural promoter. For example, the coprecipitation may be effected by utilizing water-soluble salts of the catalytic metals involved in preparing the system such as ferric chloride, ferrous chloride, ferric nitrate, ferrous nitrate, aluminum chloride, aluminum nitrate, cuprous chloride, cupric chloride, cuprous nitrate, cupric nitrate, nickel chloride, nickel perchlorate, nickel nitrate, cobaltic chloride, ruthenium chloride, ruthenium nitrate, molybdenum chloride, molybdenum oxychloride, molybdenum phosphate, vanadium bromide, vanadium chloride, titanium chloride, titanium iodide, chromic acetate, chromic nitrate, chromic sulfate, zinc chloride, zinc iodide, zinc permanganate, zinc sulfate, manganese acetate, manganese perchlorate, manganese formate, manganese selenate, etc. It is to be understood that the aforementioned soluble salts of transition metals are only representative of the class of compounds which may be employed and that the present invention is not necessarily limited thereto.

The aforesaid salts are then admixed in a suitable solvent such as water with a soluble salt of the structural promoter such as aluminum chloride, aluminum nitrate, aluminum bromide, silicon sulfate, silicon chloride, titanium fluoride, titanium nitrate, titanium oxalate, lanthanum bromide, lanthanum chloride, yttrium bromide, yttrium chloride, zirconium chloride, zirconium oxyiodide, etc. After dissolving the salts which are present in an amount so that the finished catalyst system will contain a predetermined amount of transition metals, the solution is neutralized by the addition of a neutralizing agent such as sodium hydroxide, potassium hydroxide, lithium hydroxide, ammonium hydroxide, sodium carbonate, potassium carbonate, lithium carbonate, ammonium carbonate, etc. to a pH of about 7, the neutralization of the solvent acting to promote the precipitation of the compounds. After formation of the precipitate, it is then rinsed with deionized water to remove the alkaline material and dried, preferably at a temperature slightly in excess of 100° C., i.e., 110° C. The precipitate is then calcined in an air atmosphere at a temperature in the range of from about 350° to about 550° C. for a period of time which may range from about 2 to about 24 hours.

It is also contemplated within the scope of this invention that the structural promoter may be added to or admixed with the transition metal by utilizing a relatively high temperature fusion of the two components. For example, iron in the form of solid iron oxide may be thoroughly admixed with a solid structural promoter such as alumina, silica, zirconia, etc. and the mixture is then heated to a temperature in excess of about 1000° C. to form the desired compound.

The catalyst compound which may be prepared by either of the above methods is then impregnated with a chemical promoter of the type hereinafter set forth in greater detail whereby a more uniform distribution of the chemical promoter on the active surfaces of the catalyst compound may be achieved. The impregnation is effected by treating the catalyst compound containing the structural promoter with a nonaqueous solution of an alkali metal superhydride. Examples of an alkali metal superhydride which may be employed to effect the desired impregnation will include potassium trimethyl-borohydride, potassium triethyl-borohydride, potassium tripropyl-borohydride, potassium tributyl-borohydride, lithium trimethyl-borohydride, lithium triethyl-borohydride, lithium tripropyl-borohydride, lithium tributyl-borohydride, lithium tri-sec-butyl-borohydride, potassium tri-sec-butyl-borohydride, sodium tri-sec-butyl-borohydride, etc. The superhydrides are dissolved in a nonaqueous solvent such as ethers including tetrahydrofuran, diethylether, etc., paraffins such as n-pentane, n-hexane, n-heptane, etc.; cycloparaffins such as cyclopentane, cyclohexane, methylcyclopentane, etc.; aromatics such as benzene, toluene, the xylenes, etc., the amount of alkali metal superhydride in the solution being sufficient to afford a catalyst system which will contain from about 0.2 to about 5%, based on the weight of the catalytic components, of the alkali metal. The impregnation of the catalyst compound with the alkali metal superhydride is preferably effected at impregnation conditions including ambient temperature and atmospheric pressure, although it is contemplated that other temperatures which may be subambient in nature and other pressures may also be utilized. After impregnation has been effected for a predetermined period of time, the excess solution is removed, and the catalyst system is then washed, dried and subjected to a final calcination step at a temperature in the range of from about 350° to about 550° C. After calcination of the composite, if so desired, the catalyst system may be activated by treating said composite in a hydrogen atmosphere which is effected by flowing hydrogen over the composite while heating to a temperature in the range of from about 300° to about 450° C. for a period of time which may range from about 2 to about 24 hours.

The catalyst composites or systems which have been prepared according to the method hereinbefore set forth may be utilized as catalysts for a wide variety of chemical reactions. As an example, the catalyst system may be employed in a type of gas conversion process known as the water-gas shift reaction in which water and carbon monoxide are reacted in the presence of the catalyst system to form carbon dioxide and hydrogen. The water-gas shift reaction is effected at reaction conditions which will include temperatures in the range of from about 250° to about 500° C. and pressures ranging from atmospheric up to about 100 atmospheres. In addition to the water-gas shift reaction, the catalyst system may also be employed in a Fischer Tropsch reaction in which carbon monoxide and hydrogen are reacted to form a variety of hydrocarbons such as paraffins. The reaction conditions which are employed in this type of reaction are similar to those which are utilized in the water-gas shift reaction and will include temperatures in the range of from about 200° to about 400° C., and pressures which may range from atmospheric up to about 100 atmospheres, the mole ratio of hydrogen to carbon monoxide being in a range of from about 1:2 to about 6:1 moles of hydrogen per mole of carbon monoxide. Another type of gas conversion process which may employ the catalyst system prepared according to the process of the present invention comprises an ammonia synthesis reaction in which hydrogen and nitrogen are reacted in the presence of such a catalyst system at reaction conditions which include a temperature in the range of from about 500° to about 700° C. and an elevated pressure in the range of from about 100 to about 1000 atmospheres. While the above examples are drawn mainly to gas conversion reactions, it is to be understood that other types of chemical reactions may be effected while employing the catalyst system prepared according to the process of this invention.

The following examples are given to illustrate a process for obtaining catalyst systems containing a uniform distribution of promoters. However, it is to be understood that the examples are given merely for purposes of illustration and that the present invention is not necessarily limited thereto.

EXAMPLE I

A catalyst system may be prepared by placing ferric nitrate and aluminum nitrate in a reaction vessel along with water. The solution may then be stirred and a sodium carbonate solution added to the nitrate mixture at a temperature of about 60° C., the amount of sodium carbonate solution which may be added being that which is necessary to adjust the pH of the solution to about 7. After allowing the ensuing precipitate to stand for a predetermined period of time, the precipitate may be separated from the aqueous solution, rinsed with water to remove any residual sodium and dried at a temperature of about 110° C. The solid ferric oxide containing aluminum for a structural promoter may then be calcined in an oven under a flowing air atmosphere at a temperature of 400° C.

The iron oxide containing aluminum which may be prepared according to the above paragraph may then be impregnated with a potassium triethyl-borohydride containing solution by treating said iron oxide with a nonaqueous solution of superhydride dissolved in tetrahydrofuran. The impregnation may be allowed to proceed for a period of about 30 minutes following which the impregnated iron oxide may be vacuum dried and calcined for a period of about 24 hours at a temperature of 400° C.

EXAMPLE II

In a manner similar to that set forth in Example I above, a catalyst system may be prepared by treating ferric nitrate, aluminum nitrate and copper nitrate in an aqueous solution with sodium carbonate in an amount sufficient to adjust the pH of the solution to about 7. After allowing the precipitate to stand for a predetermined period of time, the precipitate may be separated from the solution, rinsed with deionized water to remove any residual sodium and dried at a temperature in excess of 100° C. Thereafter, the solid ferric oxide containing aluminum and copper may be calcined at a temperature of 400° C. under a flowing air atmosphere.

The catalyst composite may then be impregnated by treatment with a solution of sodium trimethyl-borohydride dissolved in tetrahydrofuran for a period of about 0.5 hours following which the excess nonaqueous solution may be removed, the impregnated catalyst composite then being dried and calcined at a temperature of 400° C. for a period of 24 hours to prepare the desired catalyst system.

EXAMPLE III

A catalyst system may be prepared by treating a mixture of cobaltic chloride and ruthenium chloride dissolved in water with an aqueous sodium carbonate solution at a pH of about 7. After allowing the precipitate to stand for a predetermined period of time, the precipitate may be separated from the aqueous portion of the solution, rinsed with water to remove residual sodium and dried at a temperature of about 110° C. The resulting composite may then be impregnated with an aqueous solution of zirconium chloride and after a period of 0.5 hours, the drying and calcination is repeated. The structurally promoted ruthenium and cobalt catalyst may then be impregnated with a nonaqueous solution of lithium triethyl-borohydride dissolved in tetrahydrofuran. After allowing the impregnation to proceed for a period of 0.5 hours, the excess lithium triethyl-borohydride may be removed and the impregnated catalyst composite dried and calcined at a temperature of 400° C. for a period of 24 hours to obtain the desired catalyst system.

EXAMPLE IV

In a manner similar to that hereinbefore set forth, an aqueous solution of copper chloride along with silicon chloride may be treated with sodium carbonate to effect a precipitation of the desired salt. The resulting copper oxide containing silicon as a structural promoter therefor may then be impregnated with a solution of lithium tri-sec-butyl-borohydride dissolved in tetrahydrofuran for a period of 0.5 hours. Following the impregnation, the lithium impregnated copper oxide may then be dried and calcined under conditions similar to that hereinbefore set forth to obtain a catalyst system containing a uniform distribution of the lithium throughout the catalyst composite.

We claim as our invention:

1. A method for the preparation of an iron catalyst system which comprises treating an iron-containing compound with a structural promoter to form an iron-containing structural promoted catalyst, then contacting said catalyst at a temperature in the range of from about $-80°$ C. to about ambient temperature, in a non-aqueous solution, with an alkali metal borohydride, to afford a catalyst system having from about 0.2 to about 5 wt % alkali based on the weight of the catalytic components, said non-aqueous solvents being selected from the group consisting of ethers, paraffins, cycloparaffins and aromatics, and recovering the resultant iron catalyst system with optimized catalyst activity.

2. The method as set forth in claim 1 in which said structural promoter comprises an aluminum-containing compound.

3. The method as set forth in claim 1 in which said structural promoter comprises a silicon-containing compound.

4. The method as set forth in claim 1 in which said structural promoter comprises a titanium-containing compound.

5. The method as set forth in claim 1 in which said structural promoter comprises a zirconium-containing compound.

6. The method as set forth in claim 1 in which said catalyst contains iron and alumina.

7. The method as set forth in claim 1 in which said catalyst contains iron, copper and aluminum.

8. The method as set forth in claim 1 in which said alkali metal superhydride is potassium triethyl-borohydride.

9. The method as set forth in claim 1 in which said alkali metal superhydride is sodium trimethyl-borohydride.

10. The method as set forth in claim 1 in which said alkali metal superhydride is lithium triethyl-borohydride.

11. The method as set forth in claim 1 in which said alkali metal superhydride is lithium tri-sec-butyl-borohydride.

12. The method as set forth in claim 1 in which said alkali metal superhydride is tri-sec-butyl-borohydride.

13. The method of preparation of claim 1 further characterized in that said iron containing compound and said structural promoter are co-precipitated.

14. The method of preparation of claim 1 further characterized in that said iron-containing compound and said structural promoter are fused at high temperature of in excess of 1000° C.

* * * * *